United States Patent
Yoshida et al.

(10) Patent No.: US 7,430,216 B2
(45) Date of Patent: *Sep. 30, 2008

(54) COMMUNICATION APPARATUS

(75) Inventors: Takehiro Yoshida, Tokyo (JP); Motoaki Yoshino, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

This patent is subject to a terminal disclaimer.

(21) Appl. No.: 11/102,694

(22) Filed: Apr. 11, 2005

(65) Prior Publication Data

US 2005/0179958 A1 Aug. 18, 2005

Related U.S. Application Data

(62) Division of application No. 09/597,150, filed on Jun. 20, 2000, now Pat. No. 6,904,051.

(30) Foreign Application Priority Data

Jun. 22, 1999 (JP) .................. 11-176118
Jul. 30, 1999 (JP) .................. 11-217787

(51) Int. Cl.
*H04L 12/403* (2006.01)

(52) U.S. Cl. ............. 370/452; 358/404; 358/407; 358/440

(58) Field of Classification Search ............ None
See application file for complete search history.

(56) References Cited

U.S. PATENT DOCUMENTS

| | | | |
|---|---|---|---|
| 5,111,307 A | 5/1992 | Yoshino | 358/407 |
| 5,157,514 A | 10/1992 | Yoshioka | 358/407 |
| 5,196,843 A | 3/1993 | Yoshino | 340/825.52 |
| 5,392,133 A | 2/1995 | Nakajima | 358/407 |
| 5,521,719 A | 5/1996 | Yamada | 358/438 |
| 5,585,854 A | 12/1996 | Makino | 358/407 |
| 5,594,867 A | 1/1997 | Yoshida | 395/200.15 |
| 5,668,640 A | 9/1997 | Nozawa et al. | 358/434 |
| 5,724,156 A | 3/1998 | Satou | 358/407 |
| 5,841,843 A | 11/1998 | Bristow et al. | 379/100.09 |
| 5,852,500 A | 12/1998 | Yoshino | 358/440 |
| 6,115,141 A | 9/2000 | Kim | 358/404 |
| 6,507,414 B1 | 1/2003 | Yoshida | 358/407 |

FOREIGN PATENT DOCUMENTS

| | | |
|---|---|---|
| JP | 05-191553 | 7/1993 |
| JP | 07-111575 | 4/1995 |
| JP | 10-126601 | 5/1998 |

*Primary Examiner*—Frank Duong
(74) *Attorney, Agent, or Firm*—Fitzpatrick, Cella, Harper & Scinto

(57) ABSTRACT

There is disclosed a communication apparatus designed to assure the execution of ring type multi-address data transmission. In order to ensure that a user see a received image, transfer to a next station is not carried out until the received image is printed out. With the passage of specified time after the reception of the image, transfer is executed to the next station.

9 Claims, 16 Drawing Sheets

FAX A → FAX B → FAX C → FAX D

| ADDRESS "0" | TSI (TEL NUMBER) |
| --- | --- |
| ADDRESS "1" | SUB-ADDRESS AND COMM SPECIFICATION CORRESPONDING TO MEMORY BOX |
| ADDRESS "2" | METHOD OF RING TYPE MULTI-ADDRESS TRANSMISSION FOR NEXT STATION |

COMMUNICATION APPARATUS

CROSS REFERENCE TO RELATED APPLICATION

This application is a divisional of Ser. No. 09/597,150, now U.S. Pat. No. 6,904,051, filed on Jun. 20, 2000.

BACKGROUND OF THE INVENTION

1. Field of the Invention

The present invention relates to ring type multi-address communications.

2. Related Background Art

In the case of a conventional facsimile equipment, transmission of one data to a plurality of addresses (or destinations) has generally been carried out by means of multi-address transmission, that is, a transmission method, which transmits identical data to a plurality of addresses by executing sequential facsimile communications with addresses targeted for transmission. However, since multi-address transmission is executed to all the addresses from one facsimile equipment unit, this transmission method has resulted in the uneven distribution of communication costs among the units of facsimile equipment, and has had a problem of the impossibility of receiving from other facsimile equipment units during the execution of multi-address transmission. As one example of the measures to solve such a problem, there has been presented a ring type multi-address transmission method, which is designed to sequentially perform transmission from a facsimile equipment FAXA to FAXB, from FAXB to FAXC, from FAXC to FAXD, and from FAXD to FAXA.

However, such a ring type multi-address transmission method has had a drawback that it is impossible to determine whether the operator of a facsimile equipment having received data regarding ring type multi-address transmission has seen the data or not. Particularly, in activities of in-town circle meetings, and so on, it is important to verify whether the users of all the addresses have seen the data or not.

SUMMARY OF THE INVENTION

An object of the invention is to provide a facsimile equipment unit capable of surely showing data regarding ring type multi-address transmission to the operator of the facsimile equipment having received the data.

DETAILED DESCRIPTION OF THE PREFERRED EMBODIMENTS

Embodiment 1

Next, description will be made of the preferred embodiments of the invention with reference to the accompanying drawings.

Figure 1:
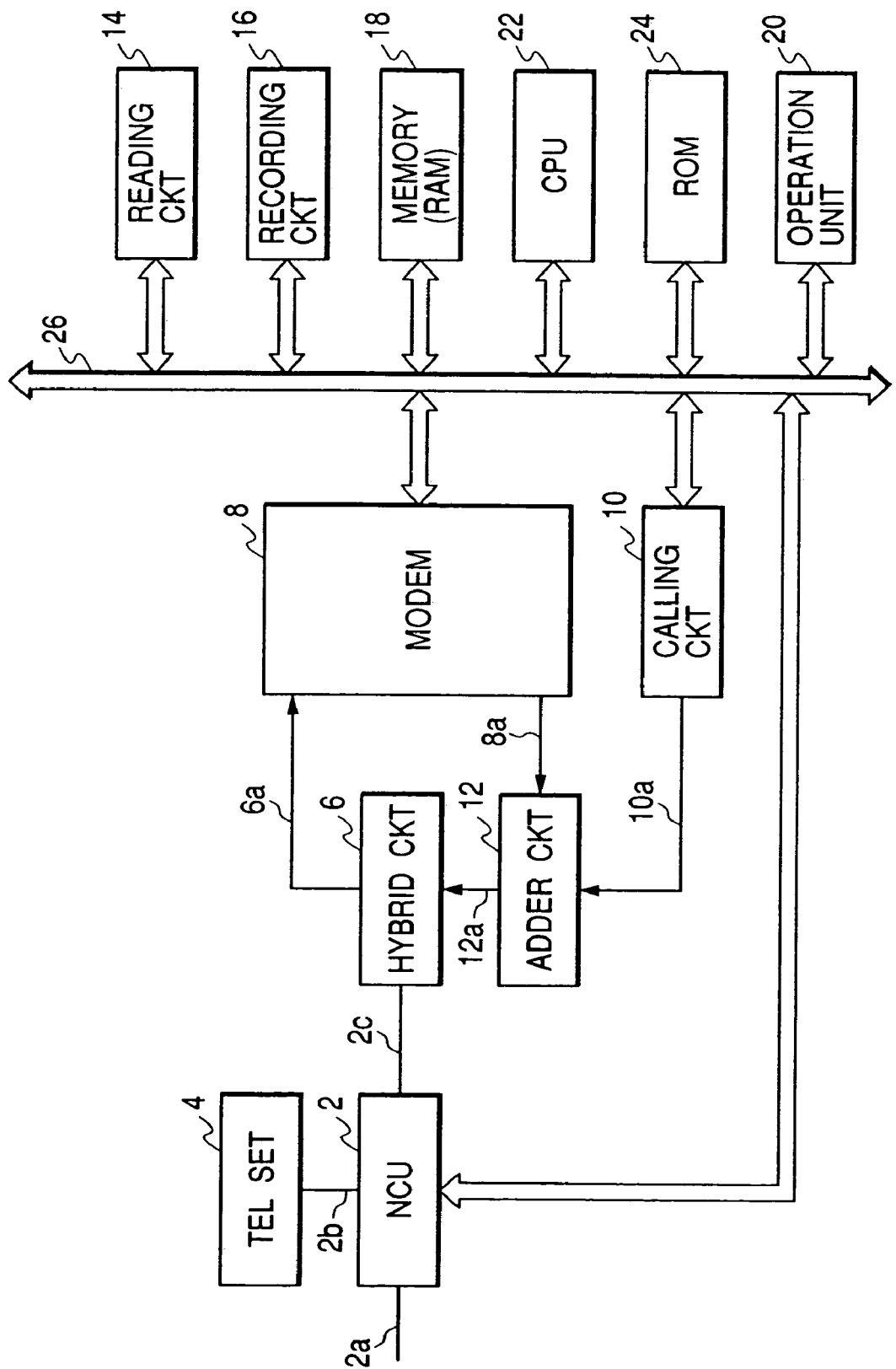
FIG. 1 is a view showing a general constitution of a facsimile equipment unit according to the preferred embodiments of the invention.

FIG. 1 is a view showing a general constitution of a facsimile constitution according to the preferred embodiments of the invention.

As shown in FIG. 1, the facsimile equipment of the preferred embodiments of the invention comprises a network control unit (referred to as "NCU", hereinafter) 2 connected to a telephone line 2a.

The NCU 2 is connected to a terminal of the telephone line to use a telephone exchange network for data communications, and so on, and adapted to perform connection control of the telephone exchange network, switching to a communication channel and loop holding. The NCU 2 also connects the telephone line 2a to a telephone set 4 side (CML OFF) via a signal line 2b based on control from a bus 26, and connects the telephone line 2a to a facsimile equipment side (CML ON) via a signal line 2c. Usually, the telephone line 2a is connected to the telephone set 4 side.

A hybrid CKT 6 separates a signal transmitted via the telephone line 2a from a transmission system from a signal received via the telephone line 2a from a receiving system. In addition, the hybrid CKT 6 sends out a signal transmitted from an adder CKT 12 to the telephone line 2a through the NCU 2, receives a signal from a partner station through the NCU 2, and sends out the received signal to a modem 8 via a signal line 6a.

The modem 8 performs modulation/demodulation based on ITU-T Recommendations V. 8, V. 21, V. 27ter, V. 29, V. 17, and V. 34, and each transmission mode is specified by means of control of the bus 26. The modem 8 receives a signal transmitted through the bus 26, outputs modulated data to the adder CKT 12 via a signal line 8a, receives a signal from the hybrid CKT 6 via the signal line 6a, and then outputs demodulated data to the bus 26.

A calling CKT 10 receives telephone number data by means of signal from the bus 26, and outputs a DTMF selection signal to the adder CKT 12 via a signal line 10a.

The adder CKT 12 receives data from the modem 8 via the signal line 8a and data from the calling CKT 10 via the signal line 10a, and outputs the result of addition to the hybrid CKT 6 via a signal line 12a.

A reading CKT 14 is composed of an image pickup device such as a charge coupling device (CCD) or the like, and an optical system. The reading CKT 14 sequentially reads images equivalent to one line of a main scanning direction from a transmitted document, and outputs data regarding the read images to a recording CKT 16. The recording CKT 16 sequentially records each line of data outputted to the bus 26.

A memory 18 is a memory (RAM) for work, and adapted to store raw or coded data regarding read data, and store received data, composite data or the like via the bus 26.

The memory 18 includes a memory for registering the unit's own telephone number ("own-station telephone number"), and a memory for registering a sub-address and communication specifications corresponding to a memory box. As an exemplary registration of such sub-address signal communication specifications, FIG. 2 shows ring type multi-address transmission, for example, ones corresponding to memory boxes in respective facsimile equipment units FAXA, FAXB, FAXC and FAXD.

Figures 2, 3:
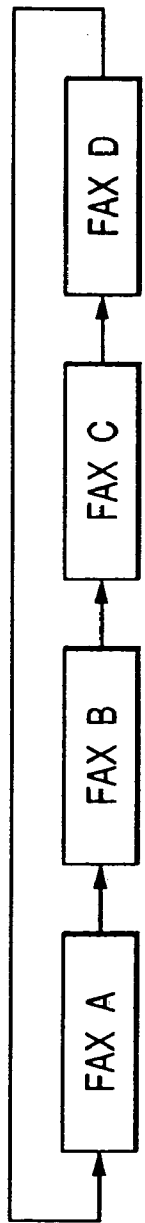
FIG. 2 is a view illustrating an example of registration of a sub-address signal and communication specifications corresponding to a memory box in an example of ring type multi-address transmission.
FIG. 3 is a view illustrating a memory constitution of a memory 18.

With regard to a memory constitution of the memory 18, as shown in FIG. 3, a telephone number of own station is registered in an address 0; a sub-address and communication specifications corresponding to the memory box in an address 1; and a ring multi-address transmission method for a next station in an address 2. For example, for the FAXB, 03-3111-2222 is registered as a telephone number of own station.

In the described case, in the ring type multi-address transmission of facsimile equipment units FAXA to FAXD as shown in FIG. 2, for example, 1234 is registered as a sub-address corresponding to a memory box 01 for each of the facsimile equipment units (e.g. FAXB) and, as communication specifications therefor, ring type multi-address transmission for a next station (e.g. FAXC) is registered.

An operation unit 20 includes a one-touch dial, an abbreviation dial, a ten keys a # key, a start key, a set key, a stop key, own station telephone number registration key, a specification registration key of a memory box, and other function keys, and a display unit. Key-data is outputted to the bus 26. The operation unit 20 also receives data outputted to the bus 26, and displays the received data.

A central processing unit (CPU) 22 executes overall control for the facsimile equipment, and a later-described facsimile transmission control procedure. A control program thereof is stored in a ROM 24.

FIGS. 4 to 9 are flowcharts showing in sequence a facsimile transmission control procedure of the facsimile equipment according to a first embodiment of the invention.

This procedure is now explained by targeting the facsimile equipment FAXB, and the explanation can also be applied to the other facsimile equipment units FAXA, FAXC and FAXD.

First, the memory 18 is subjected to initialization via the bus 26 (step S2), the display unit of the operation unit 20 is cleared via the bus 26 (step S4), and the CML of the NCU 2 is turned OFF to connect the telephone line 2a to the telephone set 4 side via the bus 26 (step S6).

Subsequently, the data of the operation unit 20 is entered via the bus 26, and determination is made as to whether the registration of own station telephone number has been selected or not in an address 20 of the memory 18 (step S8). If it is determined that the registration of the own station telephone number has been selected, as the own station telephone number of the memory 18, for example, 03-3111-2222 is registered via the bus 266 (step S10), and then the process moves to step S12. On the other hand, if the registration has not been selected, then the process moves to step S12 skipping step S10.

In step S12, the data of the operation unit 20 is entered via the bus 26, and determination is made as to whether the registration of a sub-address and communication specifications corresponding to a memory box has been selected or not. If it is determined that the registration of the sub-address and communication specifications corresponding to the memory box has been selected, as the sub-address and communication specifications, for example, a sub-address signal 12324 and ring type multi-address transmission as communication specifications to a next station FAXC corresponding to a memory box 01 are registered in an address 1 of the memory 18 via the bus 26 (step S14), and then the process moves to step S16. On the other hand, if the registration has not been selected, then the process moves to step S14 skipping step S16.

In step S16, via the bus 26, determination is made as to whether the ring type multi-address transmission designation key of the operation unit 20 has been depressed or not. If it is determined that the ring type multi-address transmission designation key has been depressed, then the CML of the NCU 2 is turned ON to connect the telephone line 2a to the facsimile equipment side via the bus 26 (step S18), and calling is made to a next station FAXC via the bus 26 by using the calling CKT 10 (step S20). Then, a pre-procedure is executed to transmit the own station telephone number stored in the address 0 of the memory 18 as a ring type multi-address transmission start telephone number, and transmit 1234 as a sub-address signal (step S22). Image signal transmission is carried out (step S24), and then after a post procedure is executed (step S26), the process returns to step S6.

If it is determined in step 516 that the ring type multi-address transmission designation key has not been depressed, then the process moves to step S28, where determination is made via the bus 26 as to whether the ring type multi-address transmission continuation key of the operation unit 20 has been depressed or not. If it is determined in step S28 that the ring type multi-address transmission continuation key of the operation unit 20 has been depressed, the process moves to step S30, where determination is made via the bus 26 as to whether the display unit of the operation unit 20 indicating the presence of data received by ring type multi-address transmission is ON or not. If it is determined in step S30 that the display unit of the operation unit 20 indicating the presence of data received by ring type multi-address transmission is ON, then the process moves to step S32, where determination is made as to whether the printing of data memory-received with the sub-address 1234 has been finished or not. If it is determined in step S32 that the printing of the memory-received data has been finished, the CML of the NCU 2 is turned ON to connect the telephone line 2a to the facsimile equipment via the bus 26 (step S34), and calling is made to the next station FAXC via the bus 26 by using the calling CKT 10 (step S36). A pre-procedure is executed to transfer the ring type multi-address transmission start telephone number received when the data was memory-received (stored in the address 4 of the memory 18) to next station FAXC, and a sub-address 1234 to the same (step S38), and the data received with the sub-address 1234 is transmitted to the next station FAXC (step S40). Then, after the execution of a post procedure, the CML of the NCU 2 is turned OFF to connect the telephone line 2a to the telephone set 4 side via the bus 26 (step S44). The display of the display unit indicating the presence of data received by the ring type multi-address transmission is cleared (step S46), and the process returns to step S6.

If it is determined in step S32 that the printing of the memory-received data has not been finished, "DATA MEMORY-RECEIVED BY RING TYPE MULTI-ADDRESS TRANSMISSION CANNOT BE TRANSFERRED BEFORE PRINTOUT THEREOF TO NEXT FAX STATION" displayed on the not-shown display unit via the bus 26 (step S48), and the process returns to step S6. The display in step S48 should be erased by actuation of any one of the keys.

If it is determined in step S30 that there is no display indicating the presence of data received by the ring type multi-address transmission on the display unit, then "TO-BE-TRANSFERRED DATA MEMORY-RECEIVED BY RING TYPE MULTI-ADDRESS TRANSMISSION IS ABSENT" is displayed on the not-shown display unit via the bus 26 (step S50), and the process returns to step S6. The display in step S50 should be erased by actuation of any one of the keys.

If it is determined in step S28 that the ring type multi-address transmission continuation key of the operation unit 20 has not been depressed, then the process moves to step S5, where determination is made as to whether the ring type multi-address transmission received data printing key of the operation unit 20 has been depressed or not via the bus 26. If it is determined that the ring type multi-address transmission received data printing key of the operation unit 20 has been depressed, then the process moves to step S54, where determination is made as to whether the display unit of the operation unit 20 indicating the presence of data received by ring type multi-address transmission is ON or not via the bus 26. If it is determined that the display unit of the operation unit 20 indicating the data received by the ring type multi-address transmission is ON, then the data memory-received with the sub-address 1234 is printed out (step S56), and the process returns to step S6. If the display unit is not ON, "TO-BE-PRINTED DATA MEMORY-RECEIVED BY RING TYPE MULTI-ADDRESS TRANSMISSION IS ABSENT" is displayed on the not-shown display unit via the bus 26 (step S58), and then the process returns to step S6.

If it is determined in step S52 that the ring type multi-address transmission received data printing key of the operation unit 20 has not been depressed, then the process moves to step S60, where determination is made as to whether there is any facsimile reception or not. If the presence of facsimile reception is determined, then the CML of the NCU 2 is turned ON to connect the telephone line 2a to the facsimile equipment side via the bus 26 (step S64), and specified processing of step S66 and thereafter is executed. On the other hand, if any facsimile reception is absent, other processing is executed (step S62), and then the process returns to step S6.

Specified processing of step S66 and thereafter is carried out as follows.

First, in a pre-procedure, the presence of the receiving function of a sub-address signal is notified to a partner facsimile station (S66), and then determination is made as to whether a sub-address signal has been received from the partner station or not (step S68). If it is determined that the sub-address signal has not been received, then an image signal is received/recorded (S70). After the execution of a post procedure, the process returns to step S6.

If the presence of the received sub-address signal is determined in step S68, then the process moves to step S74, where determination is made as to whether the sub-address signal is 1234 or not. If it is determined that the sub-address signal is not 1234, reception processing corresponding to the sub-address signal is executed (step S76), and the process returns to step S6. On the other hand, if the sub-address signal is determined to be 1234, then an image signal is memory-received (step S78) and, after the execution of a post procedure (step S80), the CML of the NCU 2 is turned OFF to connect the telephone line 2a to the telephone set 4 side via the bus 26 (step S82). Determination is then made as to whether the received ring type multi-address transmission start telephone number (received by a procedure signal) coincides with the telephone number of own station or not (step S84).

If it is determined in step S84 that the received ring type multi-address transmission start telephone number does not coincide with the telephone number of own station, then the display unit of the operation unit 20 indicating the presence of data received by ring type multi-address transmission is turned ON via the bus 26 (step S86), and the process returns to step S6. On the other hand, if coincidence is determined, then the display unit of the operation unit 20 indicating the end of ring type multi-address transmission is turned ON via the bus 26 (step S88), and the process returns to step S6. The display in step S88 should be erased by actuation of any one of the keys.

According to the first embodiment of the invention, determination is made as to the specifying of ring type multi-address transmission by the sub-address signal (steps S68 and S74), the received data is memory-received if the ring type multi-address transmission is specified at the time of reception (YES in step S74) and, after the actual printing-out of the memory-received data (YES in step 532), the data is transferred to the next facsimile station (step 538). Accordingly, the transmission of the memory-received data is permitted only after its printing-out, i.e., after the operator of the facsimile equipment reads the data. Thus, it can be assured that the operator of the facsimile equipment see the data received by the ring type multi-address transmission.

Embodiment 2

Figure 10:
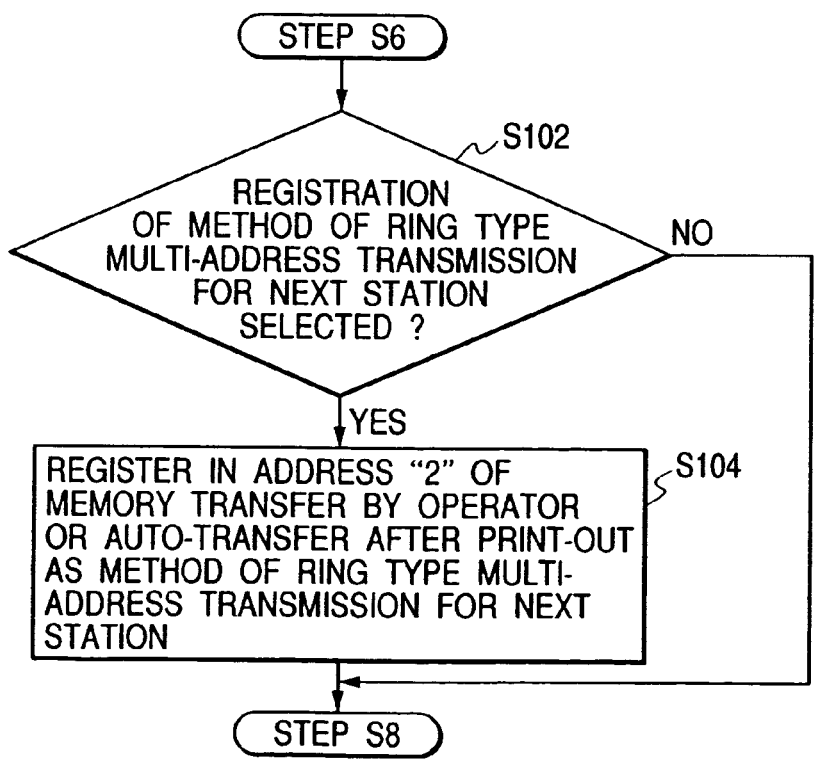
FIG. 10 is a flowchart showing a facsimile transmission control procedure of a facsimile equipment unit according to a second embodiment of the invention.
Figure 11:
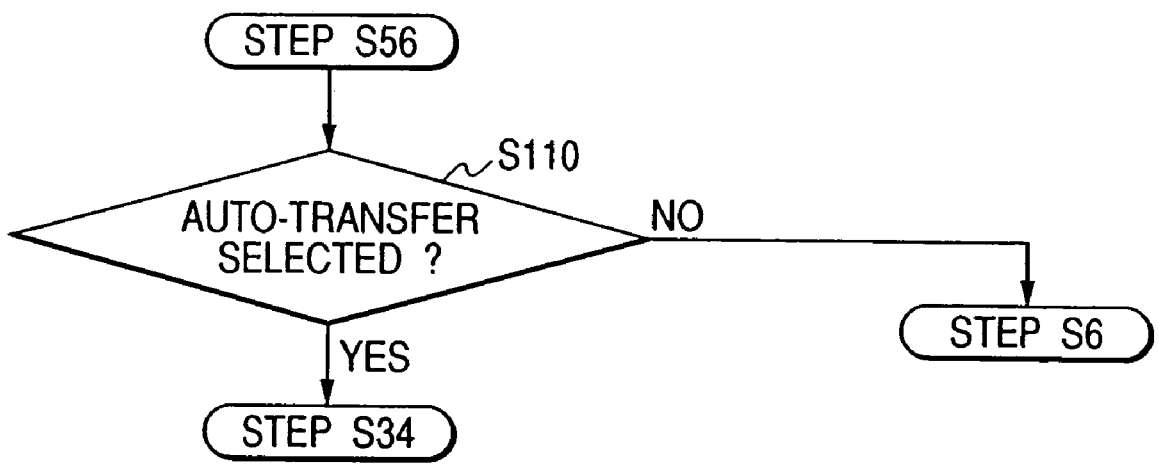
FIG. 11 is a flowchart showing the facsimile transmission control procedure of the facsimile equipment of the second embodiment.
Figure 12:
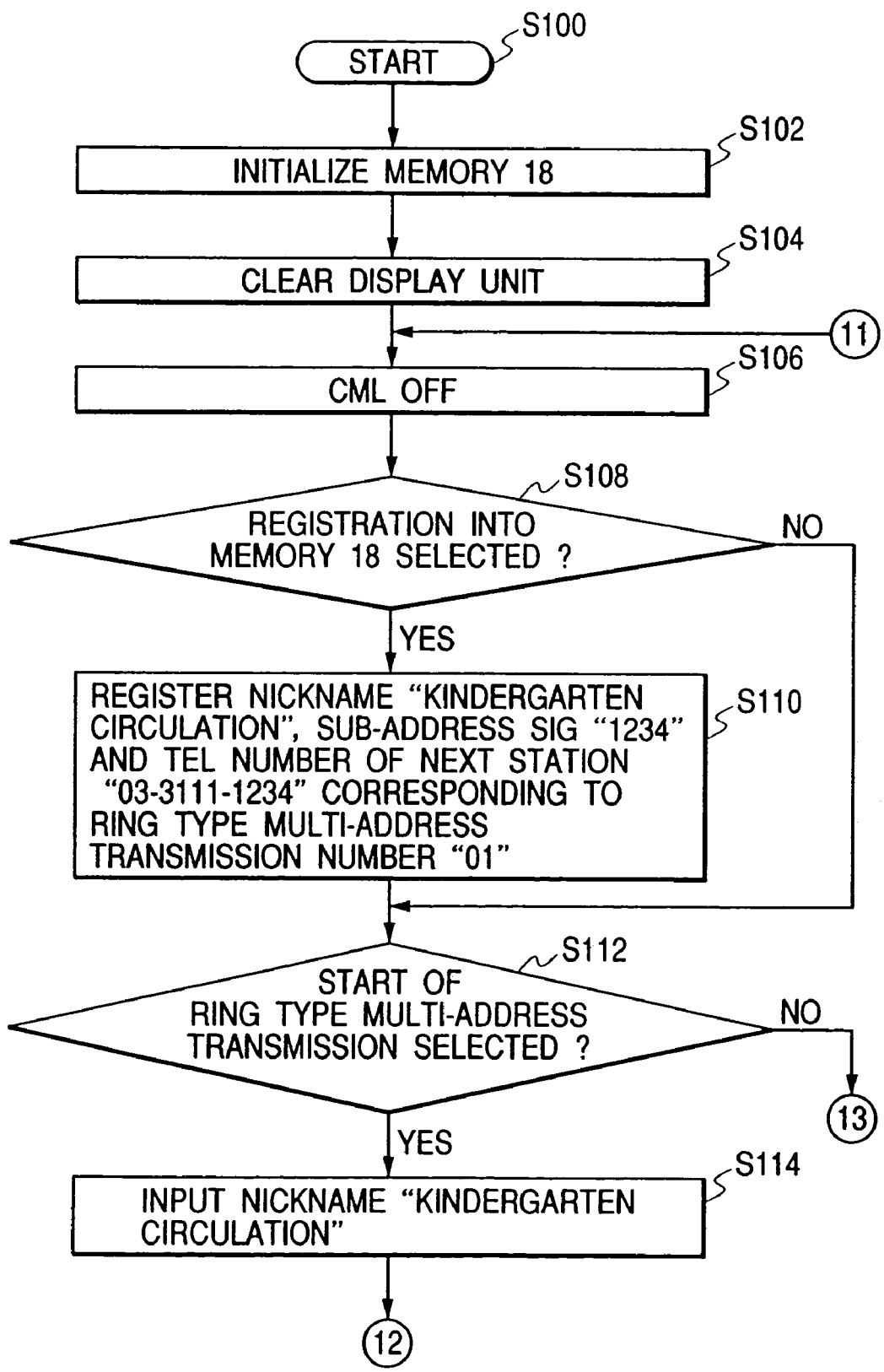
FIG. 12 is a flowchart showing a facsimile transmission control procedure according to a third embodiment of the invention.
Figure 13:
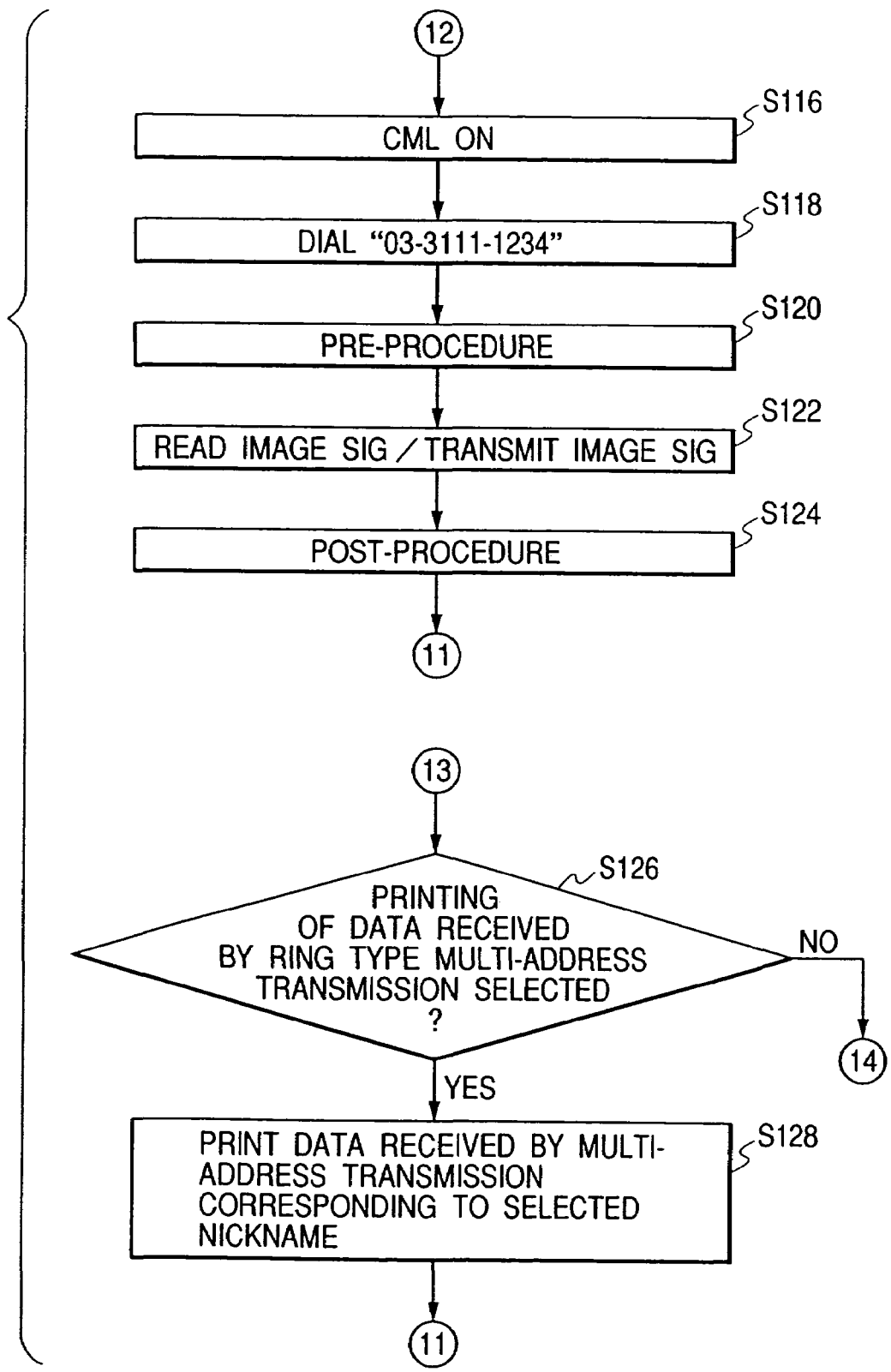
FIG. 13 is a flowchart showing the facsimile transmission control procedure continued from FIG. 12
Figure 14:
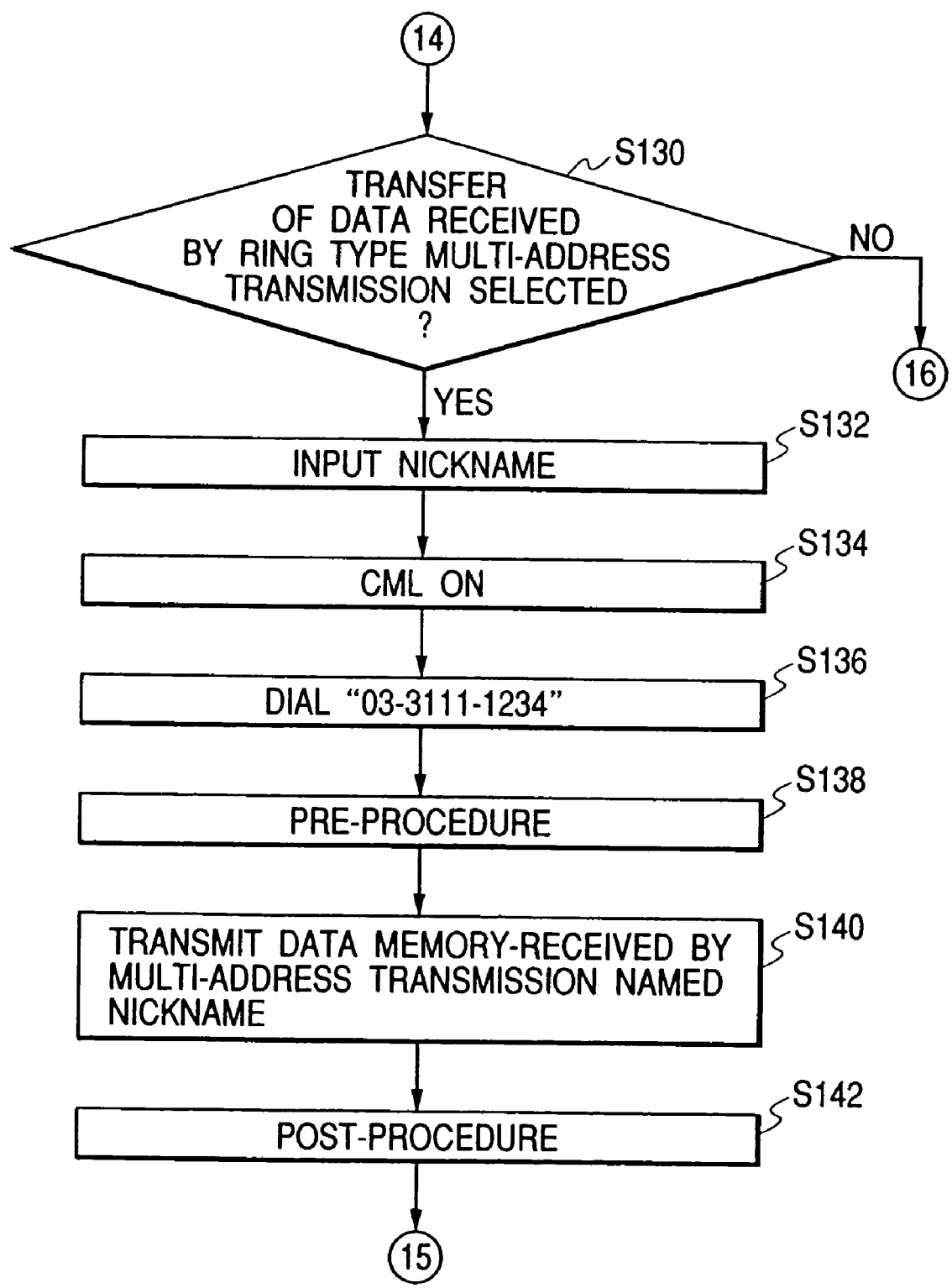
FIG. 14 is a flowchart showing the facsimile transmission control procedure continued from FIG. 13.
Figure 15:
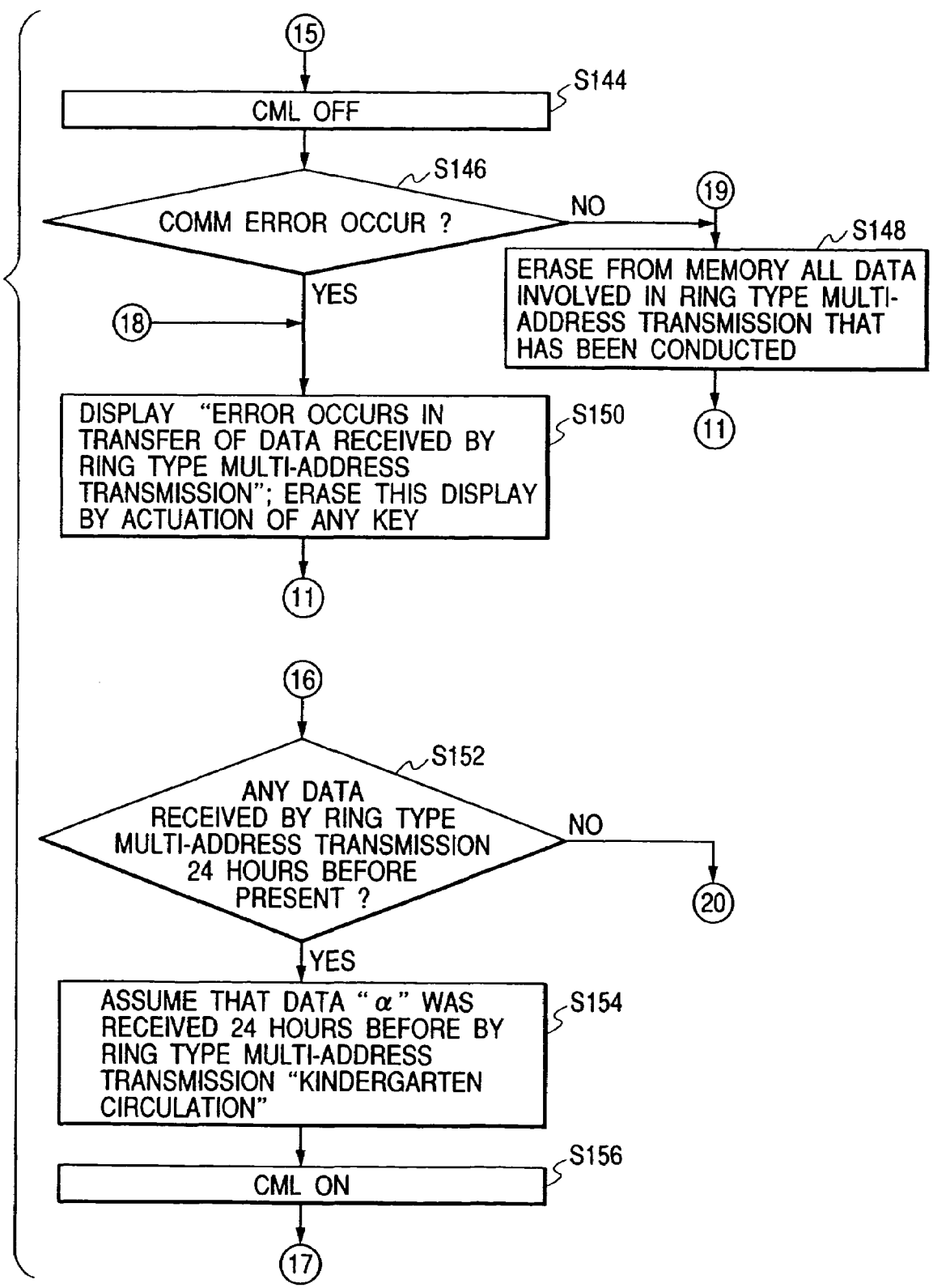
FIG. 15 is a flowchart showing the facsimile transmission control procedure continued from FIG. 14.
Figure 16:
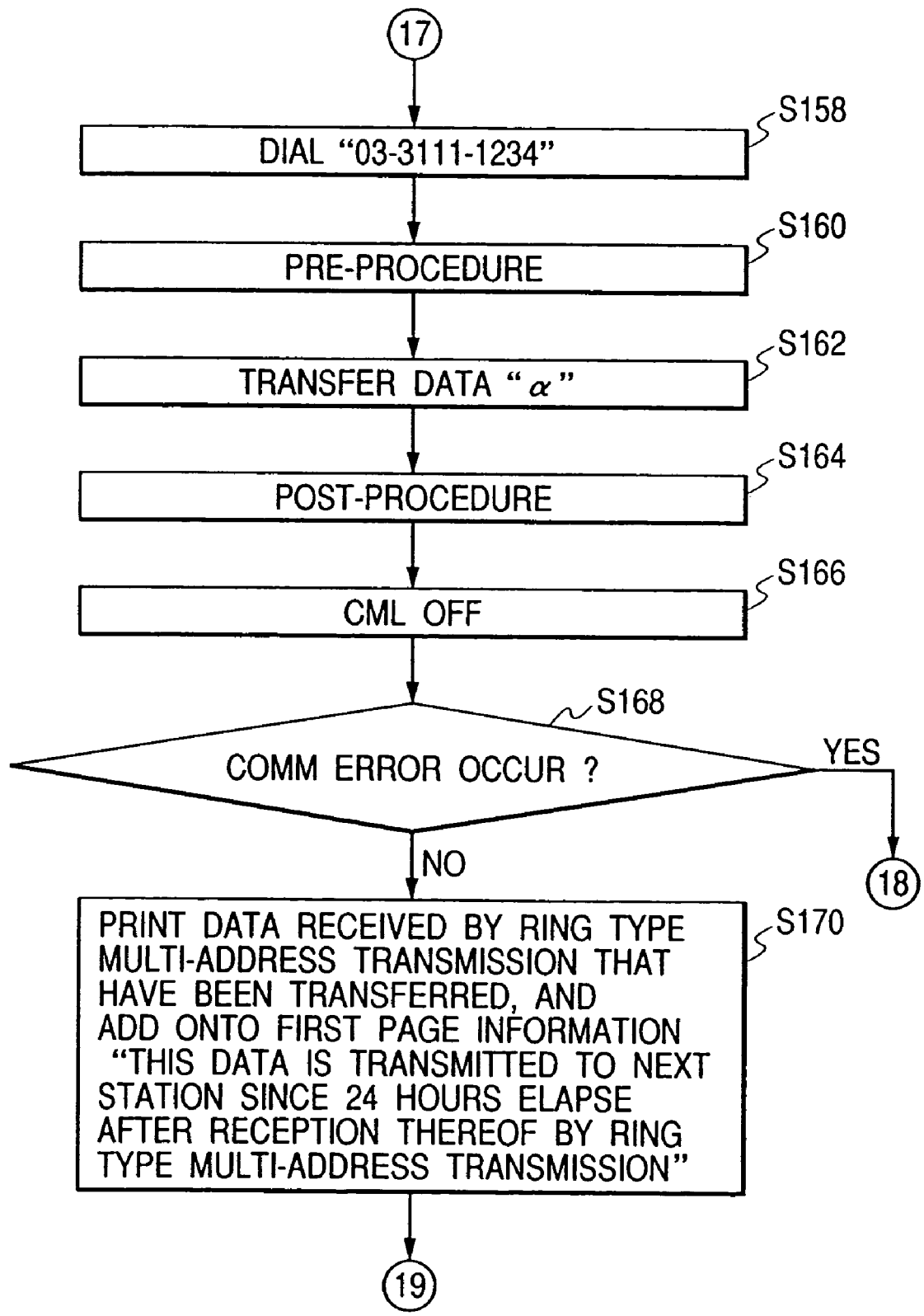
FIG. 16 is a flowchart showing the facsimile transmission control procedure continued from FIG. 15.
Figure 17:
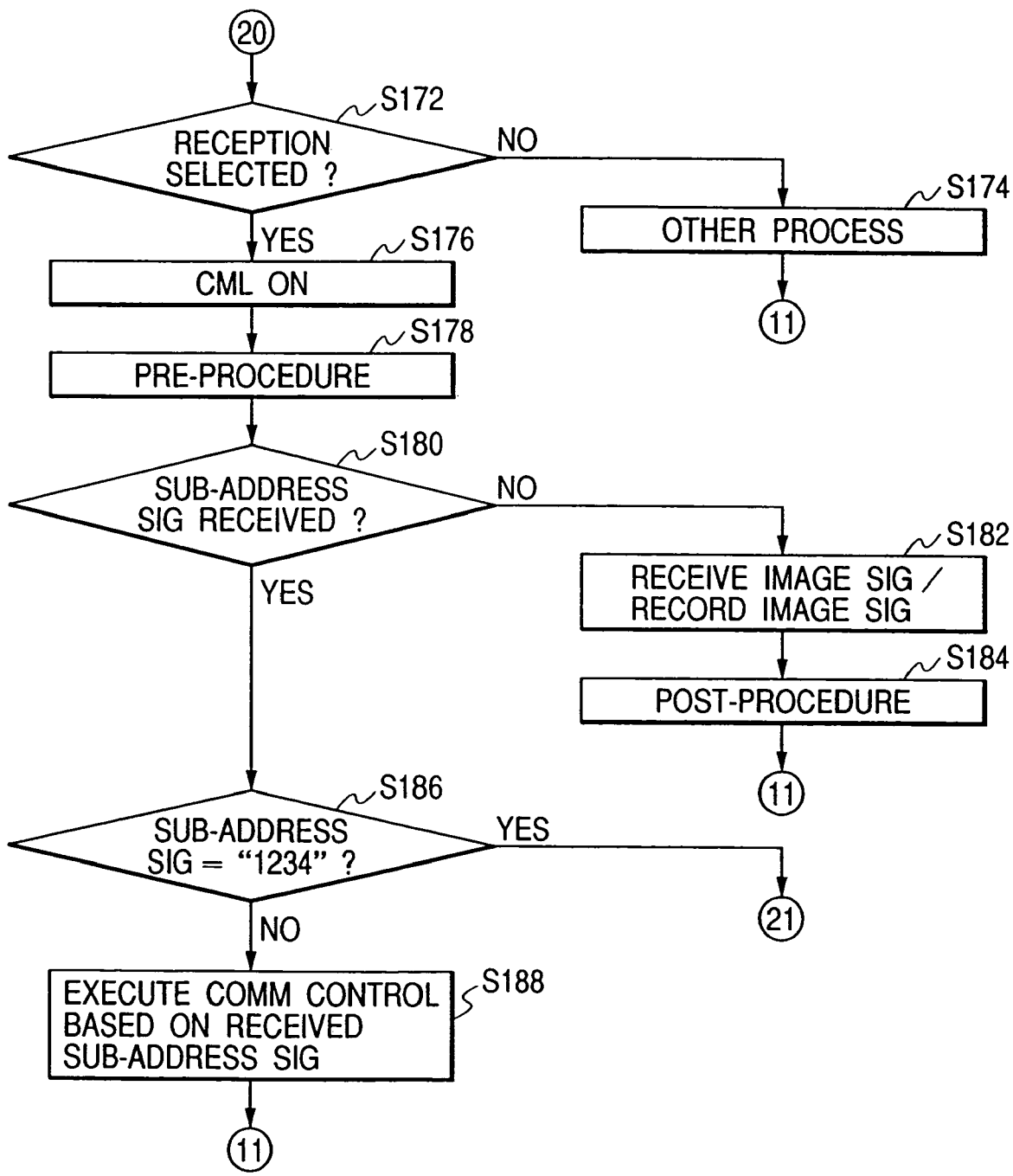
FIG. 17 is a flowchart showing the facsimile transmission control procedure continued from FIG. 16.
Figure 18:
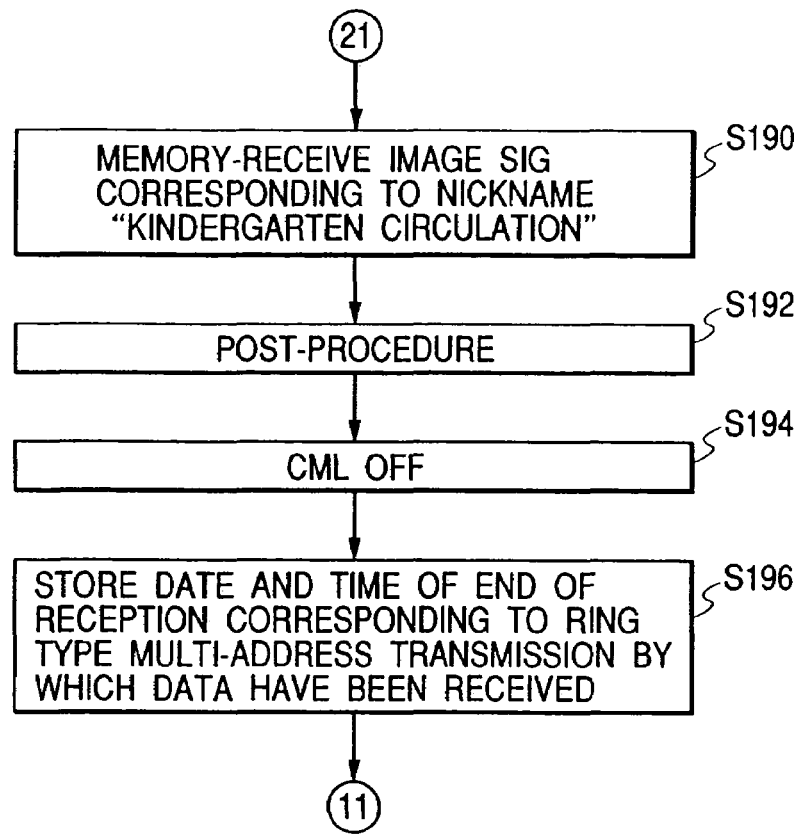
FIG. 18 is a flowchart showing the facsimile transmission control procedure continued from FIG. 17.

FIGS. 10 and 11 are flowcharts showing in sequence a facsimile transmission control procedure of a facsimile equipment according to a second embodiment of the invention. Description of portions like those of the first embodiment will be omitted, and only different portions will be described.

The second embodiment is different from the first embodiment in that either one of the following cases is selected: transmission of memory-received data by specification from an operator, and automatic transmission to a next facsimile station after the end of the memory-received data. Other than this point, the second embodiment is similar to the first. FIGS. 10 and 11 show only the foregoing difference.

Figure 4:
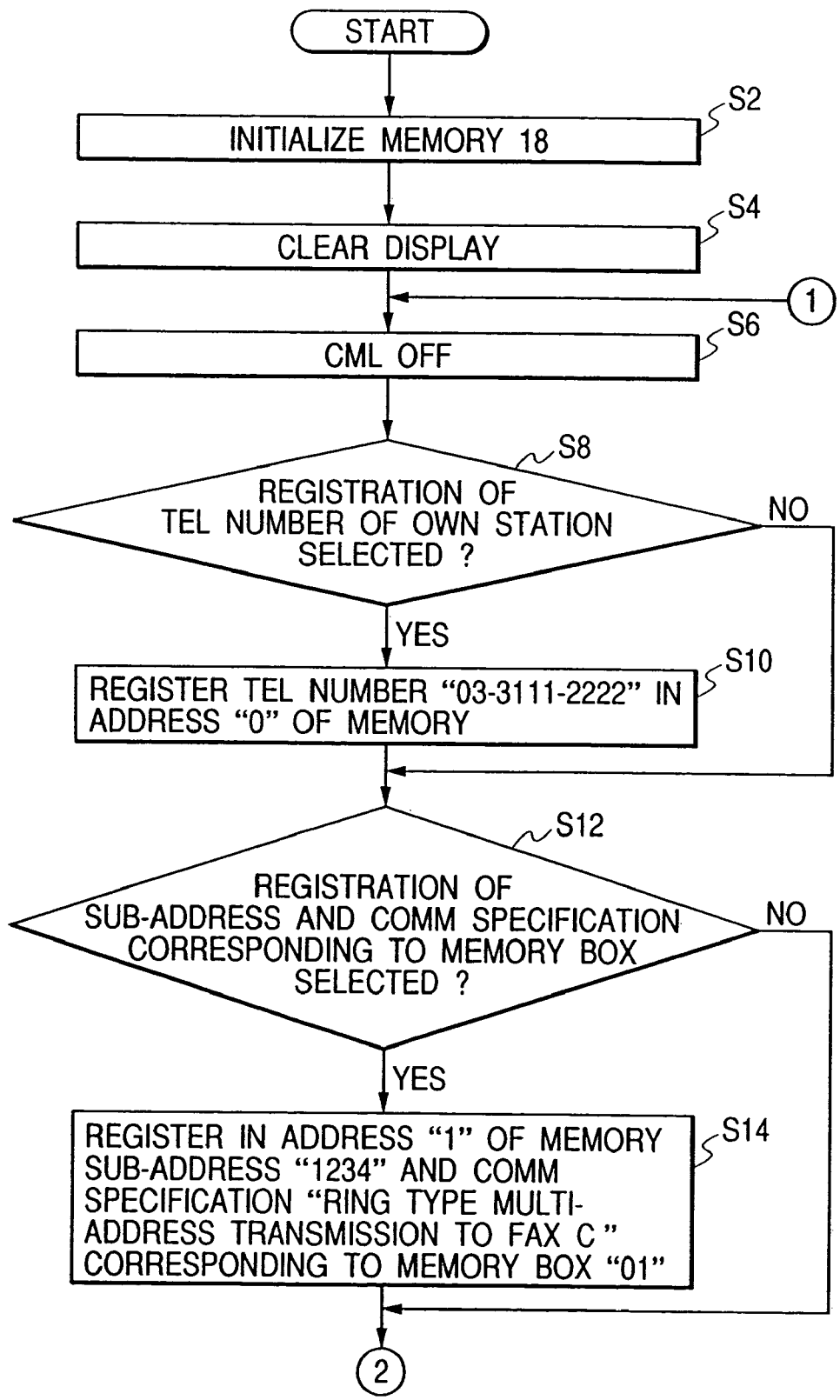
FIG. 4 is a flowchart showing a facsimile transmission control procedure of a facsimile equipment unit according to a first embodiment of the invention.
Figure 5:
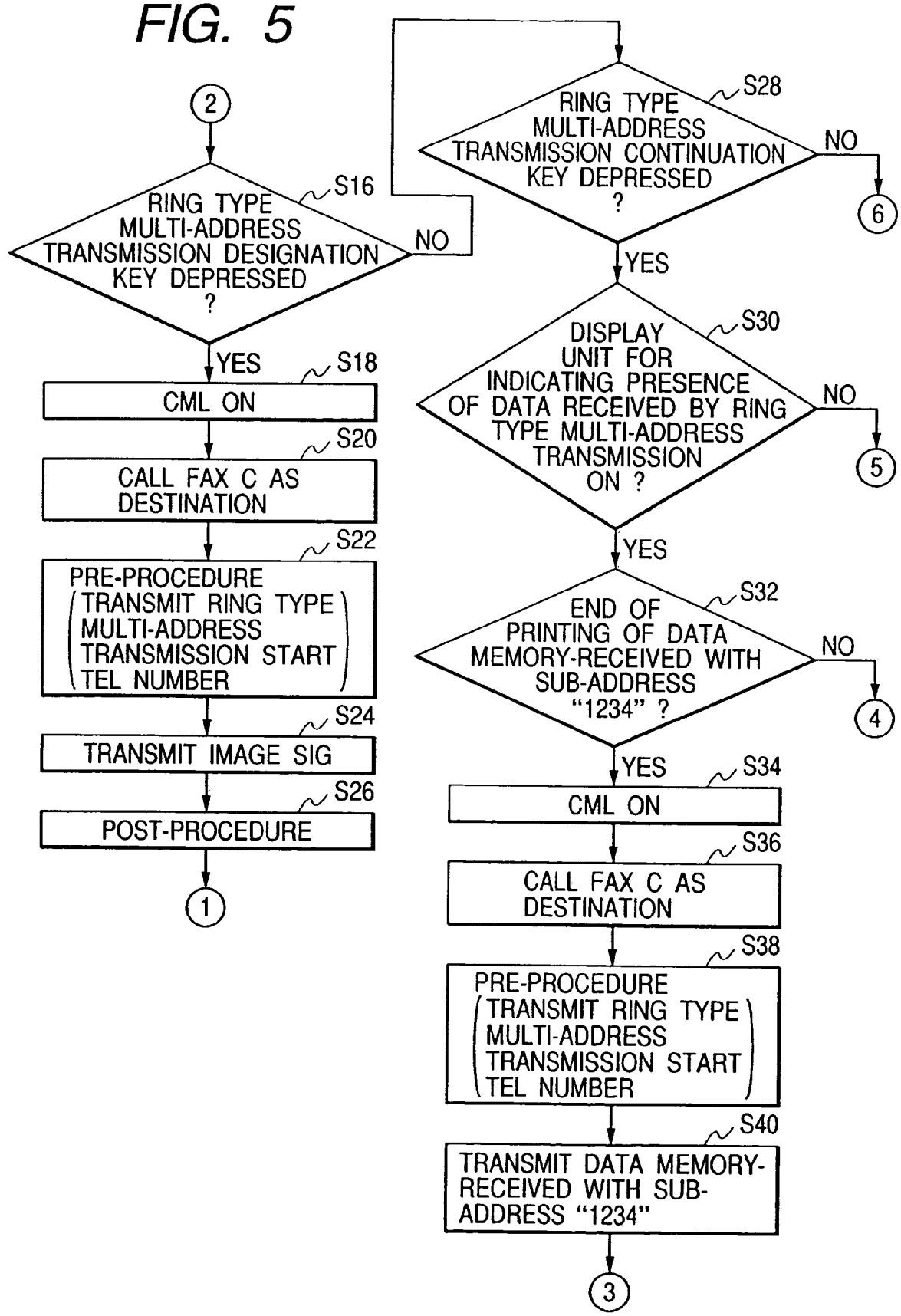
FIG. 5 is a flowchart showing the facsimile transmission control procedure of the facsimile equipment of the first embodiment.
Figure 6:
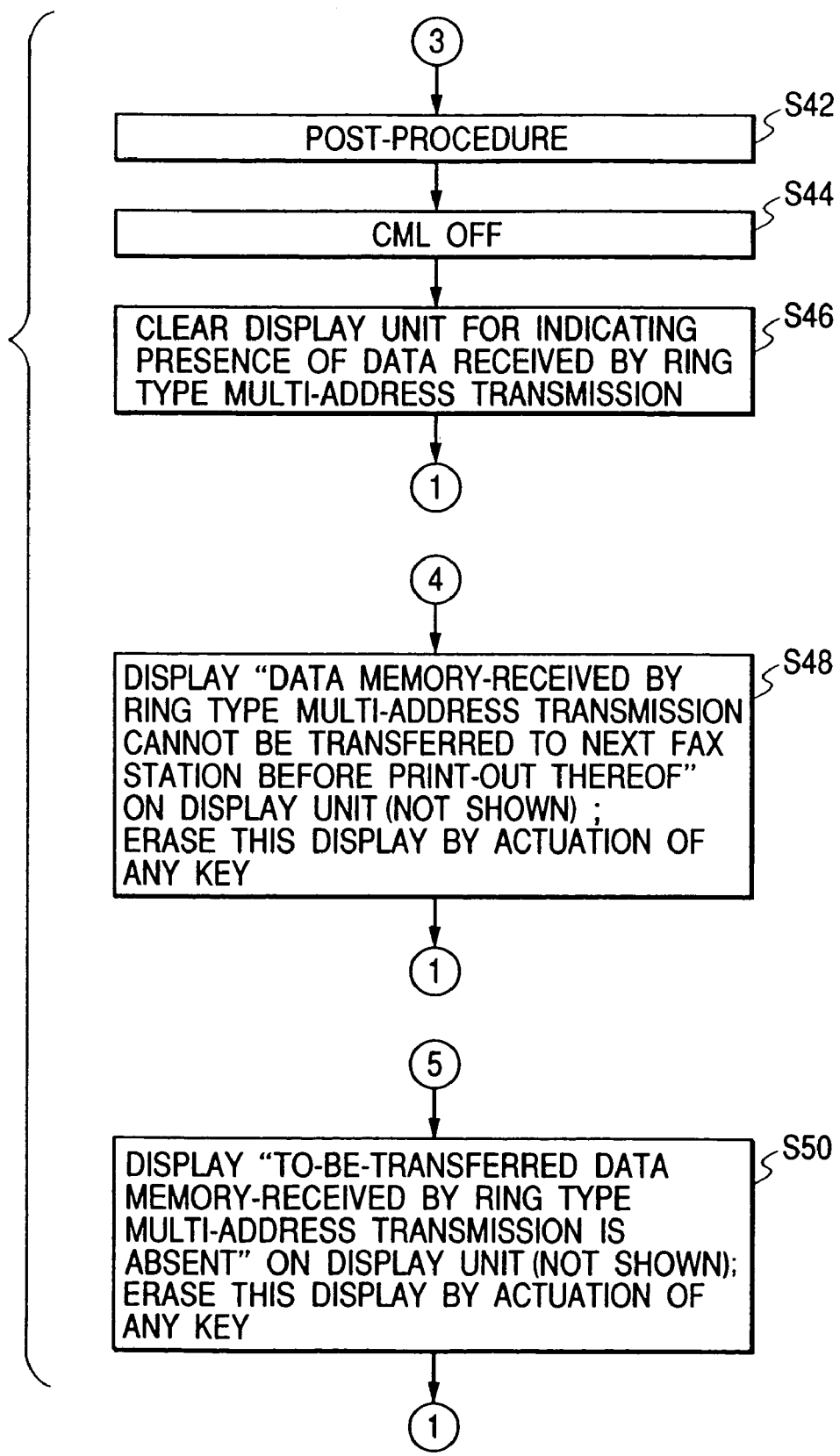
FIG. 6 is a flowchart showing the facsimile transmission control procedure of the facsimile equipment of the first embodiment.

In FIG. 10, after the processing in step S6 of FIG. 4, the data of the operation unit 20 is entered via the bus 26, and determination is made as to whether a ring type multi-address transmission method to a next station has been registered or not via the bus 26 (step S102). If the selection is determined, then via the bus 26, transfer by the operator or auto-transfer after the printing-out of the memory-received data as means of ring type multi-address transmission for a next station is registered in the address 2 of the memory 18, and the process moves to step S8 of FIG. 4. If no selection is determined, then the process moves to step S8 of FIG. 4 skipping step S104. Thus, transmission by specification from the operator or automatic transmission after the printing-out of the memory-received data can be selected.

Figure 7:
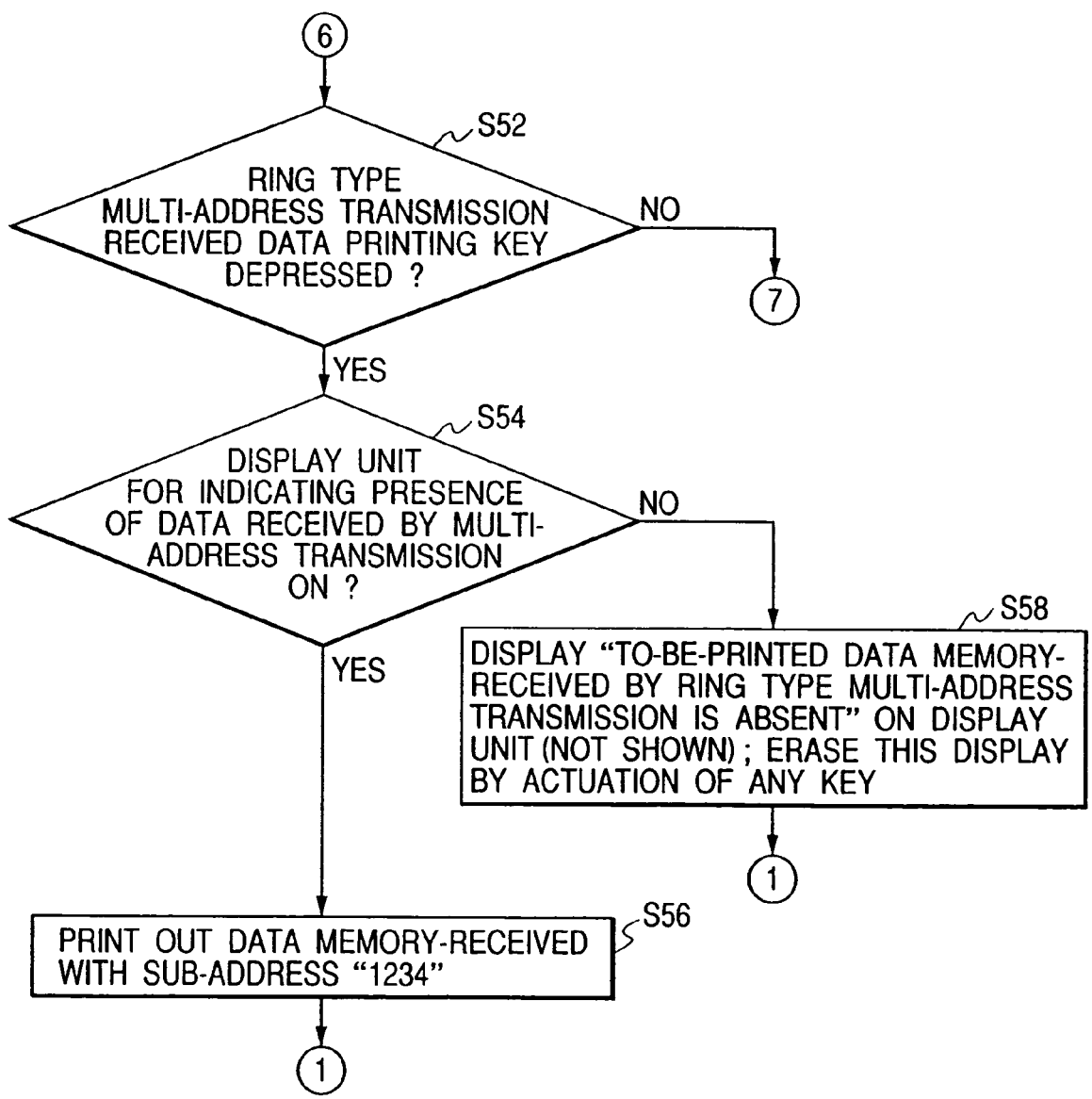
FIG. 7 is a flowchart showing the facsimile transmission control procedure of the facsimile equipment of the first embodiment.
Figure 8:
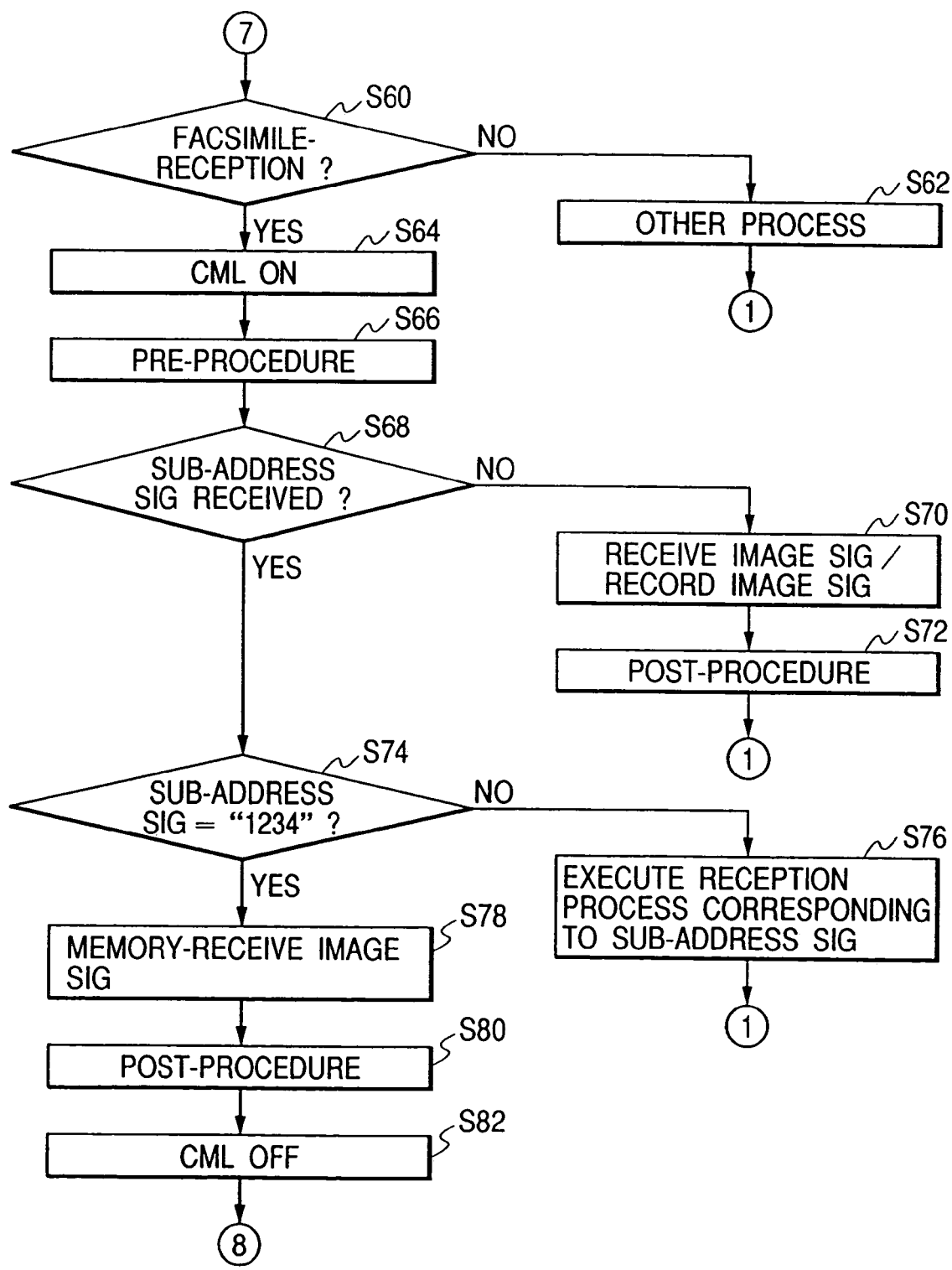
FIG. 8 is a flowchart showing the facsimile transmission control procedure of the facsimile equipment of the first embodiment.
Figure 9:
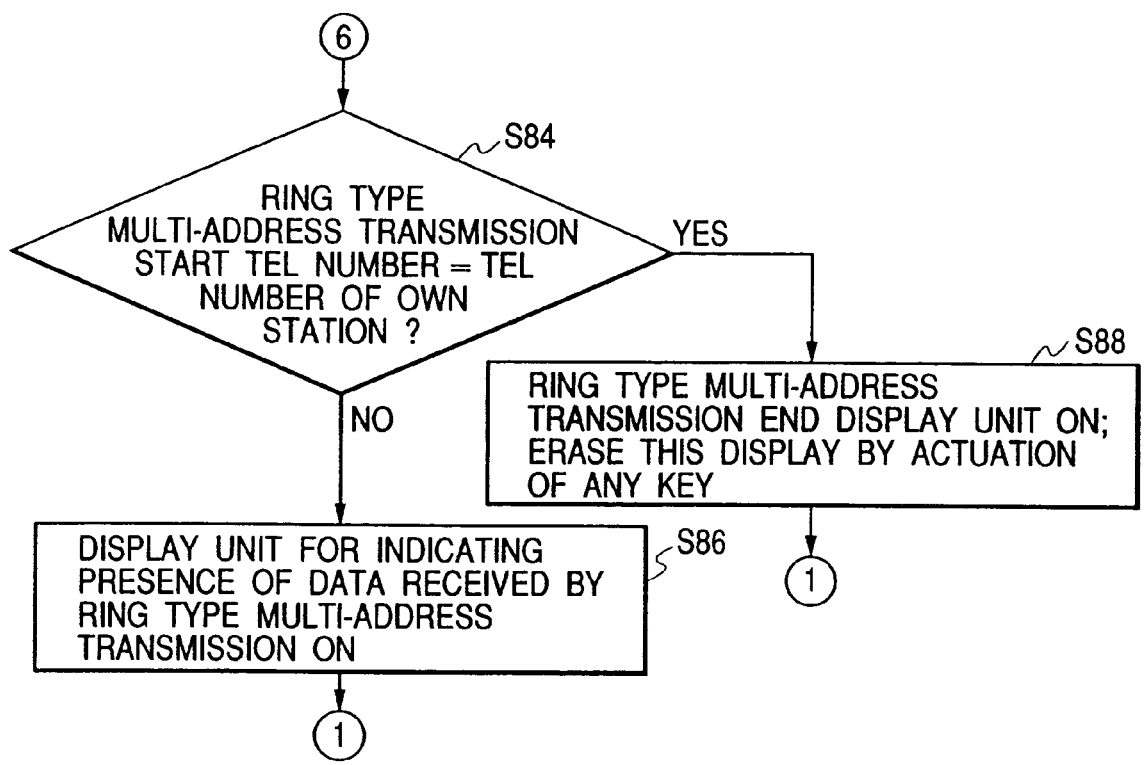
FIG. 9 is a flowchart showing the facsimile transmission control procedure of the facsimile equipment of the first embodiment.

In FIG. 11, after the end of the processing in step S56 of FIG. 7, the data of the address 2 of the memory 18 is entered via the bus 26, and determination is made as to whether auto-transfer to the next station FAXC after the printing-out of the memory-received data has been selected or not (step S110). If the selection of auto-transfer is determined, then the memory-received data is automatically transmitted to the next station FAXC by executing processing of steps S34 to S46 of FIG. 5 and thereafter. On the other hand, if no selection of auto-transfer is determined, then the process moves to step S6 of FIG. 4.

According to the second embodiment, it is possible to prevent a case where ring type multi-address transmission is disabled when the user forgets to send transmission instruction to the next station.

Moreover, since the transmission of the memory-received data to the next station by specification from the operator or the transmission to the same after the printing-out of the memory-received data can be selected, the transmission of the memory-received data can be performed manually or automatically based on selection made by the operator. Thus, it is possible to improve usability of the facsimile equipment.

Embodiment 3

In the first and second embodiments, the data received by the ring type multi-address transmission is stored in the memory and, under the condition that the user has printed out the data, transmission of the data to the next station is permitted or executed.

However, the problem of cutting-off of the ring type multi-address transmission in the midway has occurred if a member of the group for the ring type multi-address transmission is not at home for a long time.

Therefore, an object of a third embodiment is to provide an apparatus capable of uniformly distributing communication costs, verifying that the user of the group of multi-address transmission sees received data, and transferring the data to a next station even if the user of the group is not at home for a long time.

In the third embodiment, portions like those of the first embodiment are denoted by like reference numerals, and description thereof will be omitted.

In the third embodiment, the memory 18 of FIG. 1 includes a memory provided to register a nickname, a sub-address signal, and the telephone number of a next station corresponding to a ring type multi-address transmission number, and store the time, the date, the hour and minute of ring type multi-address transmission reception.

According to the third embodiment, the CPU 22 executes a facsimile transmission control program stored in the ROM 24, and thereby ring type multi-address transmission carried out.

Then, after the execution of ring type multi-address reception, its time is stored, the presence of data received by ring type multi-address transmission is displayed, and transfer to a next station is executed based on transfer selection of the data received by the ring type multi-address transmission made by the user. On the other hand, if the selection of the data received by the ring type multi-address transmission is not selected even after the passage of specified time, then the date received by the ring type multi-address transmission is forcibly printed out, and transfer of the data received by the ring type multi-address transmission to the next station is executed. In this case, the transfer to the next station is written in the printed data as the data received by the ring type multi-address transmission.

FIGS. 12 to 18 are flowcharts showing in sequence a facsimile transmission control procedure. A processing program therefor is stored in the ROM 24 as described above, and executed by the CPU 22.

After the start of processing (step S100), first, the memory 18 is subjected to initialization via the bus 26 (step S102). The display unit of the operation unit 20 is cleared via the bus 26 (step S104). Then, the CML of the NCU 2 is turned OFF via the bus 26 (step S106).

Subsequently, the data of the operation unit 20 is entered via the bus 26, and determination is made as to whether registration in the memory 18 has been selected or not (step S108). If selection of the registration in the memory 18 is determined, a nickname, a sub-address signal and the telephone number of a next station corresponding to a ring type multi-address transmission number are registered in the memory 18 via the bus 26 (step S110). For example, corresponding to a ring type multi-address transmission number 01, transfer for kindergarten circulation (nickname), 1234 (sub-address signal) and 03-3111-1234 (telephone number of next station) is registered. On the other hand, no selection of registration in the memory 18 is determined in step S108, then the process moves to step S112.

The data of the operation unit 20 is entered via the bus 26, and determination is made as to whether ring type multi-address transmission start has been selected or not (step S112). If the selection of the ring type multi-address transmission start is determined, then a nickname for performing ring type multi-address transmission, e.g., kindergarten circulation, is entered (step S114). The CML of the NCU 2 is turned ON via the bus 26 (step S116).

Calling is made to the telephone number "03-3111-1234" via the bus 26 by using the calling CKT 10 (step S118), and a pre-procedure is executed (step S120). In the pre-procedure, "1234" is transmitted as a sub-address signal. Further, reading/transmitting of an image signal is carried out (step S122), and a post procedure is executed (step S124). Then, the process returns to step S106.

On the other hand, if no selection of the ring type multi-address transmission start is determined in step S112, then the data of the operation unit 20 is entered via the bus 26, and determination is made as to whether the printing of data received by ring type multi-address transmission has been selected or not (step S126). If selection of the printing of the received data is determined, then the selected data received by the ring type multi-address transmission corresponding to the nickname is printed out (step S128). Then, the process moves to step S106. On the other hand, if no selection of the printing is determined, then the process moves to step S130.

In step S130, the data of the operation unit 20 is entered via the bus 26, and determination is made as to whether the transfer of the data received by the ring type multi-address transmission has been selected or not. If no selection of the transfer of the data received by the ring type multi-address transmission is determined, then the process moves to step S152. On the other hand, if selection of the transfer of the data received by the ring type multi-address transmission is determined, then from the data received by the ring type multi-address transmission, the nickname to be transferred, e.g., kindergarten circulation, is entered (step S132).

Then, the CML of the NCU 2 is turned ON via the bus 26 (step S134), and calling is made to the telephone number "03-3111-1234" via the bus 26 by using the calling CKT 10 (step S136). A pre-procedure is executed (step S138). In the pre-procedure, a sub-address signal "1234 " is transmitted. Further, as kindergarten circulation, the data received by the ring type transmission (memory-received) is transmitted (step S140), and a post procedure is executed (step S142). Then, the CML of the NCU 2 is turned OFF via the bus 26 (step S144).

Determination is made as to whether there have been any communication errors or not (step S146). If no communication errors are determined, all the transferred data received by the ring type multi-address transmission are erased from the memory (step S148). On the other hand, if the occurrence of a communication error is determined, "ERROR OCCURS IN TRANSFER OF DATA RECEIVED BY RING TYPE MULTI-ADDRESS TRANSMISSION" displayed on the display unit of the operation unit 20 via the bus 26 (step S150). This display can be erased by actuation of a specified key. Then, the process returns to step S106.

In step S152, determination is made as to the presence of any data received by the ring type multi-address transmission 24 hours before. If the presence of data received 24 hours before is determined, for example, if one data a of the kindergarten circulation received by the ring type multi-address transmission 24 hours before is present (step S154), then the CML of the NCU 2 is turned ON via the bus 26 (step S156). Further, calling is made to the telephone number "03-3111-1234" via the bus 026 by using the calling CKT 10 (step S158), and a pre-procedure is executed (step S160). In the pre-procedure, a sub-address "1234 " is transmitted. Then, after the reception, the data a received by the ring type multi-address transmission 24 hours before is transmitted (step S162). A post procedure is executed (step S164), and the CML of the NCU 2 is turned OFF via the bus 26 (step S166).

Further, determination is made as to the occurrence of any communication errors (step S168). If the occurrence of a communication error is determined, then the process returns to step S150.

On the other hand, if no communication errors are determined, then the transferred data received by the ring type multi-address transmission is printed out, and information that "THIS DATA IS TRANSMITTED BECAUSE OF ELAPSE OF 24 HOURS AFTER RECEPTION THEREOF BY RING TYPE MULTI-ADDRESS TRANSMISSION" is added to the first page of the print (step S170). Then, the process returns to step S148.

On the other hand, if it is determined in step S152 that there are not data received 24 hours before, then determination is made as to the selection of reception (step S172). If no selection of reception is determined, other processing is executed (step S174), and then the process returns to step S106. On the other hand, if the selection of reception is determined, then the CML of the NCU 2 is turned ON via the bus 26 (step S176), and a pre-procedure is executed (step S178). In the pre-procedure, the presence of a function of receiving the sub-address signal is notified.

Then, determination is made as to the reception of the sub-address signal (step S180). If no reception of the sub-address signal is determined, then receiving/recording of an image signal is executed (step S182), and a post procedure is carried out (step S184). On the other hand, if the reception of the sub-address signal is determined, then determination is made as to whether the sub-address signal is "1234 " or not (step S186). If the sub-address signal is not "1234 ", then communication control based on the received sub-address signal is executed (step S188). Then, the process returns to step S106.

On the other hand, if the sub-address signal is "1234 ", then an image signal is memory-received corresponding to the nickname (kindergarten circulation) (step S190). A post procedure is executed (step S192), and the CML of the NCU 2 is turned OFF via the bus 26 (step S194). Corresponding to the data just received by the ring type multi-address transmission, the date and time of the end of reception are stored in the memory 18 (step S196), and the process returns to step S106.

As apparent from the foregoing, with the facsimile equipment of the embodiment, when the transfer of the data received by the ring type multi-address transmission to the next station is executed based on selection made by the user, if the transfer of the data received by the ring type multi-address transmission is not selected even after the passage of specified time, the date received by the ring type multi-address transmission is forcibly printed out, and thereby ring type multi-address transmission to the next station can be executed.

Also, when the transfer of the data received by the ring type multi-address transmission is normally finished, the data received by the ring type multi-address transmission, which has just been transferred, can be erased from the memory.

Furthermore, if the transfer of the data received by the ring type multi-address transmission is not selected even after the passage of specified time, the date thereof is forcibly printed out and, when ring type multi-address transmission to the next station is executed, the end of the transfer of the data received by the ring type multi-address transmission to the next station can be written in the printed information.

If ring type multi-address transmission is carried out, the facsimile equipment that has lastly received the date may transmit verification information to the facsimile equipment that has first transmitted the data, or the verification information may be omitted.

Any equipment used in the group performing ring type multi-address transmission can be used as long as it has a facsimile function. Other than a dedicated facsimile equipment, a personal computer having a facsimile function can be used.

Needless to say, the invention can be applied to a case where ring type multi-address transmission is achieved by supplying a program to a facsimile equipment. In this case, a storage medium storing a program represented by software provided to achieve the invention is read by the equipment, and thereby the equipment can receive the effect of the invention.

Figure 19:
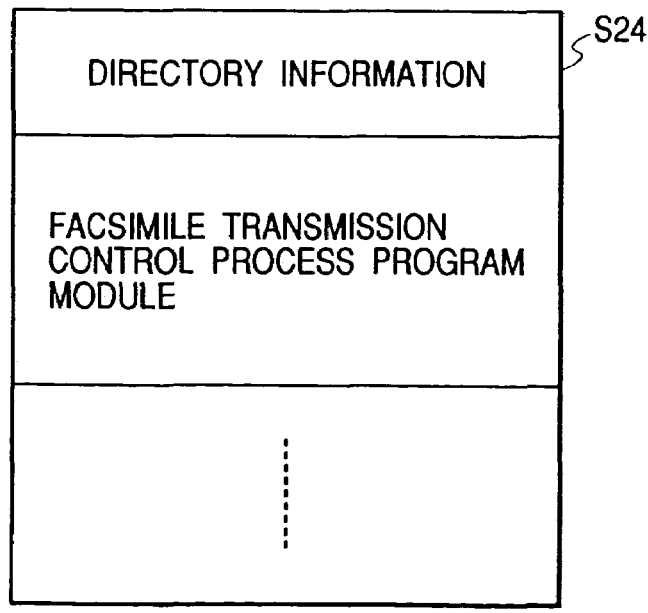
FIG. 19 is a view showing a memory map of a ROM 24 as a storage medium.

FIG. 19 is a view showing a memory map of the ROM 24 as a storage medium. The ROM 24 stores facsimile transmission control program modules, and so on, shown in the flowcharts of FIGS. 12 to 18. As a storage medium for supplying such a program module, other than the ROM, for example, a floppy disk, a hard disk, a CD-ROM, a nonvolatile memory card or the like can be used.

What is claimed is:

1. A communication apparatus for performing a ring type multi-address transmission by transferring received data to a next station, said apparatus comprising:

a receiving unit, adapted to receive data sent by a multi-address transmission;

an output unit, adapted to output the received data;

a transferring unit, adapted to transfer the received data to the next station; and an instruction unit, adapted to issue an instruction to execute a ring type multi-address transmission, wherein, when the instruction is issued by said instruction unit, said transferring unit transfers the received data to the next station, after the received data is outputted by said output unit according to a manual instruction of an operator, and wherein, before the received data is transferred to the next station without having been outputted, information, which indicates a recommendation of outputting of the received data before the received data is transferred to the next station, is notified to the operator.

2. A communication apparatus for performing a ring type multi-address transmission by transferring received data to a next station, said apparatus comprising:

a receiving unit, adapted to receive data sent by a multi-address transmission;

an output unit, adapted to output data;

a transferring unit, adapted to transfer the received data to the next station; and an instruction unit, adapted to issue an instruction to transfer the received data to the next station, wherein, when the instruction is issued by said instruction unit, said transferring unit transfers the received data to the next station, and wherein, when the instruction has not been issued by said instruction unit within a predetermined period of time, said transferring unit forcibly transfers the received data to the next station and said output unit outputs information that indicates the received data has been forcibly transferred to the next station.

3. A communication apparatus according to claim 2, further comprising:

a notification unit, adapted to notify a presence of the received data, wherein, when said receiving unit receives data, said notification unit notifies the presence of the received data, and said instruction unit issues an instruction to transfer the received data according to the notification of the presence of the received data.

4. A communication method controlling a communication apparatus for performing a ring type multi-address transmission by transferring received data to a next station, said method comprising the steps of:

receiving data sent by a multi-address transmission;

outputting the received data;

transferring the received data to the next station; and issuing an instruction to execute a ring type multi-address transmission, wherein, when the instruction is issued in said issuing step, said transferring step transfers the received data to the next station, after the received data is outputted in said output step according to a manual instruction of an operator, and wherein, before the received data is transferred to the next station without having been outputted, information, which indicates a recommendation of outputting of the received data before the received data is transferred to the next station, is notified to the operator.

5. A communication method controlling a communication apparatus for performing a ring type multi-address transmission by transferring received data to a next station, said method comprising the steps of:

receiving data sent by a multi-address transmission;

outputting data;

transferring the received data to the next station; and issuing an instruction to transfer the received data to the next station, wherein, when the instruction is issued in said issuing step, said transferring step transfers the received data to the next station, and wherein, when the instruction has not been issued in said issuing step within a predetermined period of time, said transferring step forcibly transfers the received data to the next station and said output step outputs information that indicates the received data has been forcibly transferred to the next station.

6. A communication method according to claim 5, further comprising notifying a presence of the received data, wherein, when said receiving step receives data, said notification step notifies the presence of the received data, and said issuing step issues an instruction to transfer the received data according to the notification of the presence of the received data.

7. A computer readable storage medium storing a computer program for executing a communication method controlling a communication apparatus for performing a ring type multi-address transmission by transferring received data to a next station, said computer program comprising:

code for receiving data sent by a multi-address transmission;

code for outputting the received data;

code for transferring the received data to the next station; and code for issuing an instruction to execute a ring type multi-address transmission, wherein, when the instruction is issued by said code for an issuing step, said code for a transferring step transfers the received data to the next station, after the received data is outputted by said code for an output step according to a manual instruction of an operator, and wherein, before the received data is transferred to the next station without having been outputted, information, which indicates a recommendation of outputting of the received data before the received data is transferred to the next station, is notified to the operator.

8. A computer readable storage medium storing a computer program for executing a communication method controlling a communication apparatus for performing a ring type multi-address transmission by transferring received data to a next station, said program comprising:

code for receiving data sent by a multi-address transmission;

code for outputting data;

code for transferring the received data to the next station; and code for issuing an instruction to transfer the received data to the next station, wherein, when the instruction is issued by said code for an issuing step, said code for a transferring step transfers the received data to the next station, and wherein, when the instruction has not been issued by said code for an issuing step within a predetermined period of time, said code for a transferring step forcibly transfers the received data to the next station and said code for an output step outputs information that indicates the received data has been forcibly transferred to the next station.

9. A computer readable storage medium according to claim 8, further comprising code for notifying a presence of the received data, wherein, when said code for a receiving step receives data, said code for a notification step notifies the presence of the received data, and said code for an issuing step issues an instruction to transfer the received data according to the notification of the presence of the received data.

* * * * *